JUNIOR T. BRADEN
WARREN D. CHAMBERS
JI YAH WOO
INVENTORS
BY
ATTORNEY

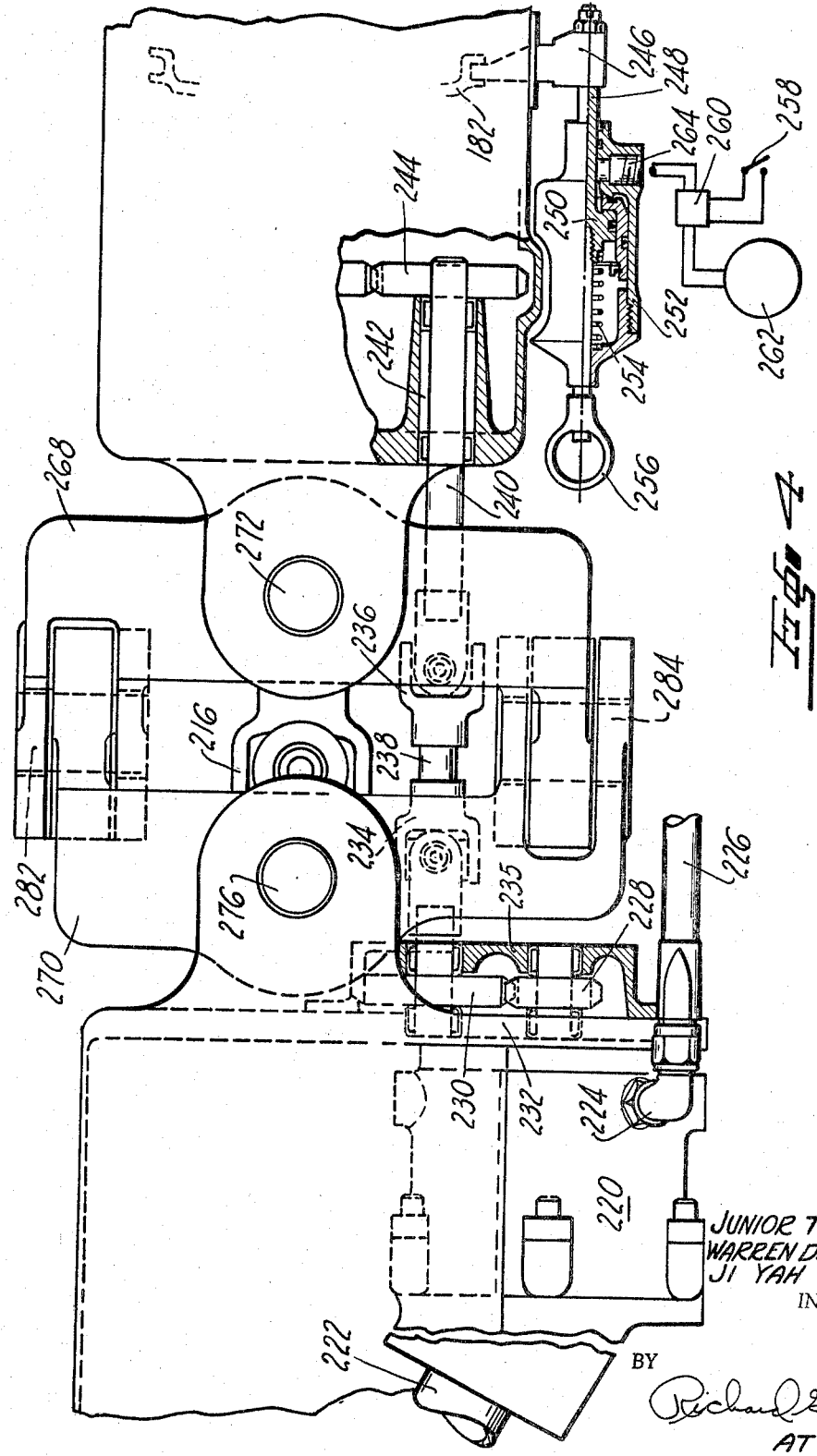

United States Patent Office 3,279,280
Patented Oct. 18, 1966

3,279,280
DUAL ACTUATOR
Junior T. Braden, Warren D. Chambers, and Ji Yah Woo, South Bend, Ind., assignors to The Bendix Corporation, Aerospace Division, South Bend, Ind.
Filed Dec. 11, 1963, Ser. No. 329,635
5 Claims. (Cl. 74—730)

This invention relates to a dual actuator means having a common drive system.

It has for some time been a problem to provide dual actuators having common drive means synchronized movement. A principal intent of our invention is to solve this problem.

More particularly, it is a principal object of our invention to provide a linear actuator having a drive means including a transmission system and a free-wheeling clutch mechanism interconnected with a brake mechanism interposed with said actuator and said transmission system.

It is also an object of our invention to provide a ball screw actuator driven by a planetary gear transmission through a disc brake mechanism with a free-wheeling one-way clutch that is adapted to release the ball screw unit and the tranmission from the power source to allow manual compression of the actuator in the event of a power failure of a drive means operatively connected to the transmission.

Other and further objects will appear from the following description of the drawings in which:

FIGURE 4 is a sectional plan view of our actuator showing internal details and arranged in accordance with our invention; and FIGURE 5 is a side view of the actuator and a fluid drive means therefor.

From the present day state of the art of aircraft, it is apparent that a swept wing aircraft designed solely on the basis of high supersonic, high performance flight simply will not perform satisfactorily for subsonic cruise take-off and landing. Even present day supersonic aircraft are designed with aspect ratios higher than that considered optimum for supersonic cruising flight in order to make take-off and landing feasible, and the take-off ground roll distance requirements of around 10,000 feet for these aircraft are nearing an upper limit. These supersonic aircraft must also climb to cruise altitude at subsonic speeds to prevent heavy shock wave ground damage, at the expense of increased fuel consumption, since the relatively low aspect ratio of the wings thereof results in increased drag due to lift while in the climb. The severity of this problem may be exemplified by a typical fuel consumption record of a supersonic swept wing transport on a transatlantic flight, where normally 30% or more of the total fuel will be expended in take-off and climbing to cruise altitude at subsonic speeds.

The most promising line of attack taken in the past to overcome the configuration incompatibility problem outlined hereinbefore involves inflight variation of wing plan form geometry, and particularly simultaneous variation of both wing sweep and aspect ratio. However, such inflight variation of wing sweep or the like has led to numerous other problems of actuator configuration which our actuator means eliminates.

Our invention has other practical uses, such as synchronized flap control for an aircraft or industrial equipment wherein simultaneous and equal incremt move- is desired in two or more machines.

Figure 2:
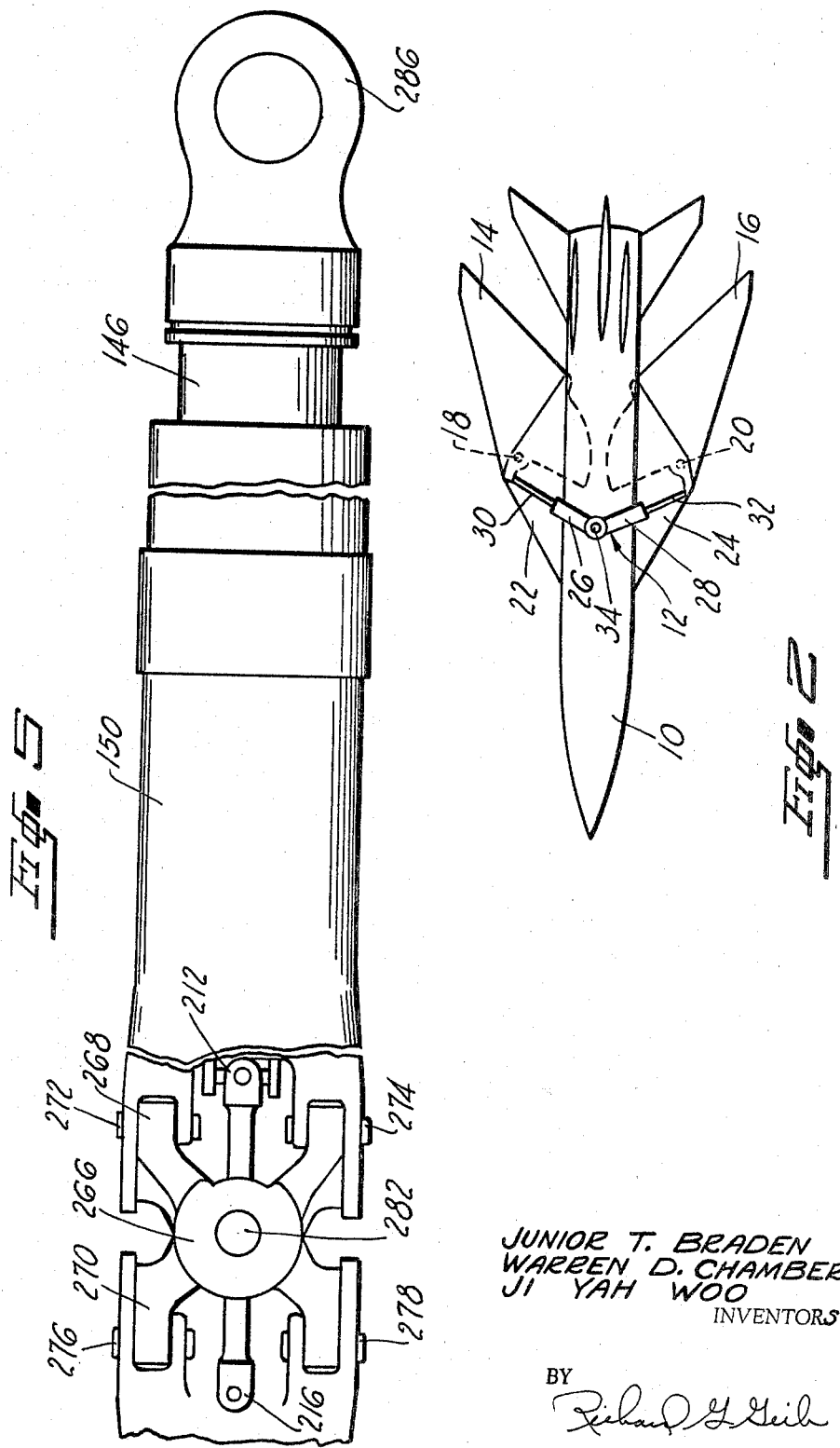
FIGURE 2 is a schematic view of an aircraft embodying a dual actuator constructed in accordance with our invention.

Getting back to the aircraft application for varying a wing geometrical plan form, we show, in FIGURE 2, an aircraft 10 having an actuator means 12 mounted to an aircraft fuselage and to each of a pair of adjustable wings 14 and 16 pivoted, as at 18 and 20, respectively, to fixed inner wing portions 22 and 24, respectively. The actuators include stationary portions 26 and 28 having telescoping portions 30 and 32, respectively, adapted to reciprocate therewithin. The stationary portions are commonly attached to a pivot 34 that may be centrally located with respect to the aircraft 10 so that the movable wing portions 14 and 16 may be permitted to flex under flight loads.

As may be readily appreciated by those skilled in the art to which our invention relates, the problem of varying a wing's plan form geometry in flight is also attendant with the problem of how to actuate said wing. It is in answer to this problem as regards the type of aircraft aforementioned that our actuator may be utilized. For example, let us refer to the schematic presentation of FIGURE 1 showing our invention with regard to a ball-screw type actuating means.

Figure 1:
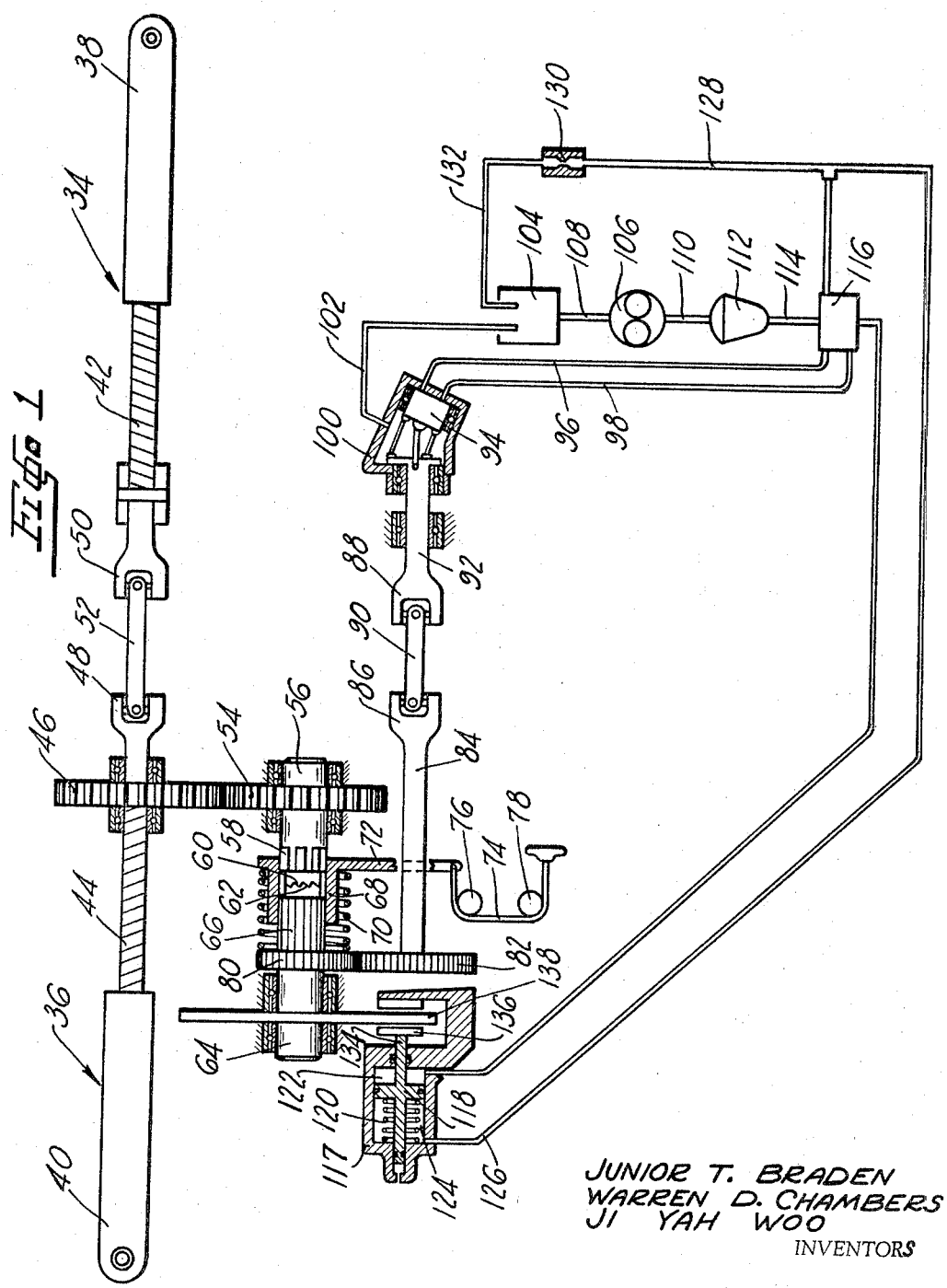
FIGURE 1 is a schematic of a dual actuator and control system therefor in accordance with the principles of our invention.

In more detail, the schematic of FIGURE 1 presents a pair of actuators 34 and 36 comprised of a translatable cylinder 38 and 40, respectively, and a rotatable, stationary member 42 and 44. Both of the rotatable members are driven by a gear 46 that is connected directly to rotatable member 44 and linked by a pair of universal joints 48 and 50 and an interconnecting shaft 52 to the rotatable member 42. The gear 46 is, in turn, driven by a gear 54 that is keyed, splined or otherwise rotatably attached to a shaft 56 that is bearingly supported in surrounding housing structure. The shaft 56, at its end opposite to that to which the gear 54 is connected, is provided with a splined area 58 and is further provided with a machined ratchet type surface 60. A similar ratchet type surface 62 is machined on another shaft 64 to cooperate with the surface 60 to form a unidirectional clutch which will allow shaft 64 to drive shaft 56 and permit shaft 56 to rotate free of shaft 64. As it is desirable to extend and retract the cylinders 38 and 40, the shaft 64 is, adjacent the ratchet surface 62, provided with a splined surface 66 so that a splined sleeve 68 may be fitted over both the shaft 64 and 66 and adapted by means of a spring 70 and a lever mechanism 72 to be translatable at the desire of an operator controlling the actuation of the cylinders 38 and 40. As may be readily seen, the spring 70 will always tend to cause the sleeve to connect the shafts 64 and 56, whereas the lever mechanism 72 will tend to be pulled to the left, as viewed in the schematic, by a cable 74 about the pulleys 76 and 78 to free shaft 56 from shaft 64. In order to drive the shaft 64 we have mounted a sun gear 80 thereto that is adapted to cooperate with gear 82 that is fixedly attached to a driven shaft 84. The drive shaft 84 is connected by a pair of universal joints 86 and 88 plus an intermediate shaft 90 to a driven shaft 92 rotatably connected to a rotor 94 of a fluid motor that is driven by way of fluid pressure from the conduits 96 and 98. As seen, the motor is also comprised of a housing 100 and has a bleed conduit 102 connected to the housing cavity to return leakage flow to a reservoir 104.

In order to provide sufficient fluid pressure to drive the rotor 94 we provide a pump 106 that is connected by way of a conduit 108 to the reservoir 104 and which delivers a fluid by way of conduit 110 to an accumulator 112 that is connected by a conduit 114 to a valve means 116. The valve means 116 is arranged to be controlled by the aforementioned operator to schedule pressure fluid to either of the conduits 96 or 98 depending upon whether extension or retraction of the cylinders 38 or 40 is desired. Simultaneously with the supply of fluid pressure to the conduits 96 and 98 the valve also schedules a flow of pressure fluid to the cylinder 117 within which a piston 118 is reciprocally mounted and biased by a spring 120 to the right as viewed by the schematic. Thus the fluid pressure from the valve 116 opposes the spring 120 in a right chamber 122. The cylinder 117 is also provided with a left chamber 124 in which the spring 120 is placed, which chamber 124 is communicated by way of a conduit 126 to a return line 128 that leads to a fixed orifice 130 from whence it is communicated by way of conduit 132 to the reservoir 104. The piston 118 is connected by means of a rod 134 to a brake pad 136 that is adapted to engage a disc 138 fixedly connected to the shaft 64. The pad 136 cooperates with a pad 138 attached to fixed structure to brake and hold the shaft 64 from movement until the valve 116 schedules fluid pressure to the rotor 94.

Figure 3:
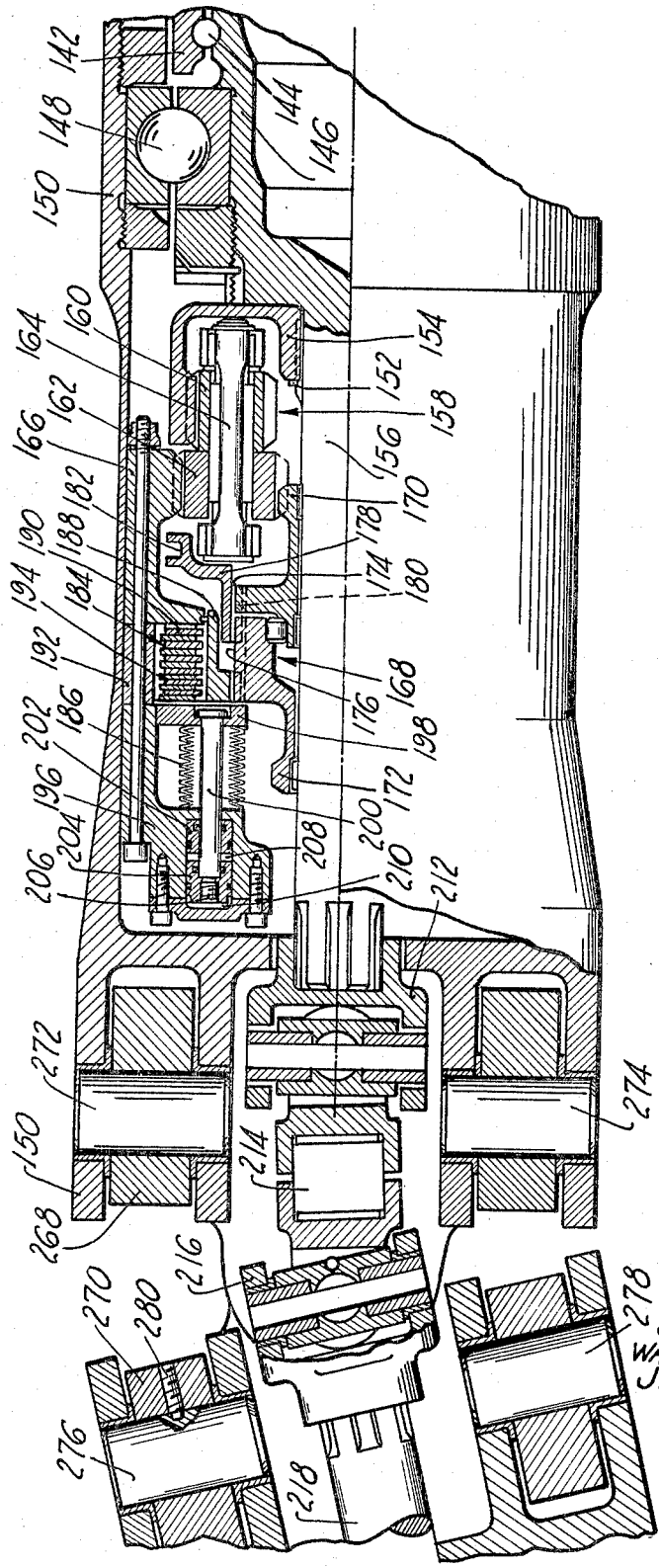
FIGURE 3 is a plan view showing the actuator mounting means in more detail.

In FIGURE 3 we show translatable member 142 that is translated by means of a ball-screw 144 driven by a rotatable member 146 that is supported by a bearing 148 in a housing 150. The rotatable member 146 is provided with a keyway that receives a key 152 to affix a ring gear 154 to a shaft-like projection 156 of the rotatable member. Within the ring gear we mount a planetary gear network 158 that is comprised of two planetary gears 160 and 162 mounted on a common shaft 164. The planetary 160 is directly mated with the teeth of the ring gear 154 whereas the planetary 162 is interposed between a rigid member 166 and a rotatable two-part sun gear 168 that includes a forward portion 170 and a rear portion 172 having a splined periphery 174 and 176, respectively. The splined peripheries of the portions 170 and 172 are interconnected by a sleeve 178 having a spline 180 and terminating in a bifurcated lever 182. The sleeve 178 is arranged to reciprocate along the spline surfaces 174 and 176 to free the portion 170 of the portion 172 when it is desired. In order to hold the rotatable member 146 from rotation we have provided a disc brake means 184 that is normally engaged by a Belleville spring means 186. The brake means is comprised of a rotatable member 188 with a plurality of brake pads 190 affixed thereto and a fixed member 192 that has a plurality of brake pads 194 affixed thereto. As seen, the belleville springs 186 are interposed between a fixed member 196 and a bearing plate 198. A rod 200 is arranged to be connected to the bearing plate 198 such that a pull upon the rod 200 will pull the bearing plate 198 to the left, as seen in FIGURE 3, thereby providing clearance between the respective pads 190 and 194 allowing the rotatable portion 188 to rotate. In order to pull the rod 200 to the left, as aforementioned, we have provided a cylinder 202 within the fixed portion 196 that is arranged to receive a piston 204 bolted, as at 206, or otherwise connected to the rod 200. To the right of the piston 204 we provide a variable volume chamber 208 and to the left of the piston a similar variable volume chamber 210, the former of which is connected to a valve means as in the schematic, aforedescribed, whereas the latter chamber 210 is connected to the fixed orifice by way of a return conduit, as aforedescribed.

As seen in FIGURE 3, the shaft-like projection 156 is connected by means of a splined fit to a universal joint 212 that is, in turn, connected to a stub shaft 214 further connected to another universal joint 216 that is affixed to a shaft 218 to drive a rotatable member for a companion actuator that is for all intents and purposes the same as the rotatable member 146 except the ball race is reversed to extend the translatable member as 142 is extended.

The opposite unit (not shown) is mounted similarly within a housing that is also the same as 150 and for these reasons not believed necessary of further description. Thus, we have provided a drive means wholly contained within one of the actuators and a means for simultaneously driving two actuators from the same drive means while allowing motion about various axes between the actuators.

In order to equalize the weight of both of the actuators so as to eliminate unsymmetrical loads, as may be undesired in an aircraft installation of our actuators, we have mounted a fluid motor 220 to the innermost flange of the actuator that does not contain the transmissin aforedescribed. However, it may be readily appreciated by those skilled in the art to which our invention relates that the drive means may be located otherwise. This motor is of a conventional type having a fluid pressure inlet 222 and a case bleed port 224 connected by means of a conduit 226 to a reservoir, as aforementioned in the schematic description. The motor 220 drives a gear 228 that in turn drives a large speed reduction gear 230 both of which are bearingly supported in a housing 232 and a removable cover 235. The gear 230 is connected by means of universal joints 234 and 236 interconnected by a stub shaft 238 to a drive shaft 240 that is bearingly supported to the housing 150 by roller bearings 242. The shaft 240 is provided with a gear 244 within the housing 150 that meets with the rear portion 172 of the sun gear 168, aforementioned to thereby complete the drive means.

We would also like to direct your attention to FIGURE 4 for showing a means to unlock the rear portion 172 from the front portion 170 of the sun gear 168. Namely, we have provided a pull-type device having an arm 246 arranged to cooperate with the bifurcated lever 182 within the housing 150, which arm is connected by means of a rod 248 to a piston 250 within a housing 252. As seen, the piston 250 is normally biased to the right in FIGURE 4 by a spring 254 so that the sleeve 178 connects both the portions 172 and 178 of the sun gear 168, as seen in FIGURE 3. In the event, however, that power to the motor 220 is no longer available and the translatable section 142 is extended as well as its companion section of interconnected actuator to the other side, an operator may pull on a ring 256 to thereby translate the sleeve 178 to the left, as viewed in FIGURE 3, and release the portion 170 from the portion 172 of the sun gear 168. If an operator does not have the time or ability to exert the force required to pull the ring 256, he may push a button 258 controlling a solenoid 260 that will release a charge of air from a storage tank 262 to the inlet port 264 to cause the piston 250 to move in the same manner as if the operator could have pulled the ring 256.

In order to mount the actuator to surrounding structure such as an airframe whereupon the actuators may be allowed limited movement in almost any direction, we have provided a connection 266 comprising a plurality of bifurcated members 268 and 270 (see FIGURE 5) which are joined by pins 272, 274 and 276, and 278 to the housings 150 and 151 of our dual actuator means. As seen in FIGURE 3, the bifurcated legs 268 and 270 are affixed to the pins 272 through 278 by means of a set screw 280 and to each other by means of a pair of spaced pins 282 and 284 above and below the shafting connecting the actuators together and to the motor 220. (See FIGURE 4.) As may be also seen in FIGURE 5, the translatable portion 146 is provided at its end with a connecting means 286 for attachment to structure that is to be moved thereby.

In operation fluid pressure is simultaneously introduced to the motor 220 and to the variable volume chamber 208 which will, when pressure is sufficient in chamber 208 to overcome the back pressure created by the orifice 130 and the return line, cause the two-part sun gear 168 to rotate thereby rotating the planetary assembly and the ring gear 154. This will then rotate the member 146 to impart motion to the balls 144 that will project the member 142, or retract the member 142 depending, of course, upon whether or not the motor 220 is being utilized to extend or retract the member 142.

In the event the member 142 is fully extended and there is no power available to retract same, it may be mechanically retracted by activating the piston 250, as by pulling on the ring 256 or as by introducing compressed air at the inlet 264, to pull the lever 182 to the left, as viewed in FIGURES 3 and 4, whereby the sun gear portion 170 is free of the portion 172. As the two-part sun gear 168 has its portions 170 and 172 interconnected by means of a one-way roller clutch 286, the movement of the splined collar 178 to the left, as seen in FIGURES 3 and 4, will allow the sun gear portion 170 to rotate irrespective of the portion 172. This, then would allow an axial compressive force to be applied to the translatable member 142 on either side of the actuating system to retract the members 142. By using a one-way roller clutch 286 we have eliminated the possibility of extending the member 142 by application of tensile loads, in that, when power has failed, the Belleville spring units 186 will energize the brake 184 holding the portion 172 and thus preventing rotation of the member 146.

As may be readily appreciated by those skilled in the art to which our invention relates, other adaptations and modifications on the structure herein before disclosed are readily apparent. Therefore, it is not our intent to be limited by the foregoing description which is offered merely as a means of describing a preferred embodiment of our invention, but it is rather our intent to be limited to the scope of the appended claims.

We claim:

1. In an actuating mechanism, a means to drive a first and second actuator comprising:
   a fluid motor;
   a drive means for said fluid motor; and
   a transmission system in one of said actuators including,
   (a) a two-part sun gear having a front gear face, a rear gear face with each face having splined portions adjacent thereto, said front gear face being operatively connected to said drive means,
   (b) a one-way clutch mechanism joining said splined portions, said clutch being arranged to drive said rear gear face by rotation of said front gear face while permitting free reverse rotation of said rear gear face,
   (c) an internally splined sleeve arranged to overlie one of said splined portions,
   (d) a resilient means adapted to urge said sleeve to overlie both of said splined portions,
   (e) a means to oppose resilient means, which means is adapted to be remotely controlled,
   (f) a planetary gear system operatively connected with said rear gear face,
   (g) a ring gear operatively connected with said planetary gear and said first actuator,
   (h) a shaft connected to said ring gear and said first actuator, and
   (i) means joining said shaft and said second actuator.

2. A means to drive a first and second actuator according to claim 1 and further comprising a brake means including:
   a plurality of rotatable brake discs operatively connected to said spline portion of said front gear face;
   a plurality of stationary brake discs fixedly connected to said first actuator;
   a spring means normally arranged to force contact of said rotatable brake discs with said stationary brake discs to hold said front gear face from rotation; and
   a fluid pressure responsive mechanism arranged to oppose said spring means upon the introduction of a fluid pressure thereto simultaneously with the introduction of a fluid pressure to said fluid motor to release said brake means.

3. A transmission system for a ball screw actuator comprising:
   a drive means for said actuator; a two-part sun gear having a front gear face, a rear gear face with each face having splined portions adjacent thereto, said front gear face being operatively connected to said drive means;
   a one-way clutch mechanism joining said splined portions, said clutch being arranged to drive said rear gear face by rotation of said front gear face while permitting free reverse rotation of said rear gear face;
   an internally splined sleeve arranged to overlie one of said splined portions;
   a resilient means adapted to urge said sleeve to overlie both of said splined portions;
   a means to oppose said resilient means, which means is adapted to be remotely controlled;
   a planetary gear system operatively connected with said rear gear face;
   a ring gear operatively connected with said planetary gear and said first actuator;
   a shaft connected to said ring gear and said first actuator; and
   means for mounting said shaft as an auxiliary drive means.

4. A transmission system according to claim 3 and further comprising:
   a plurality of rotatable brake discs;
   a rotor mounting said brake discs, which rotor is adapted to be driven by said front gear face splined portion;
   a plurality of stationary discs having means for holding them in a fixed position;
   a spring mechanism for forcing contact of said rotatable discs with said stationary discs to prevent rotation of said two-part sun gear front gear face;
   a fluid pressure responsive mechanism for opposing said spring means to deactivate said brake means; and
   a means to create a pressure differential across said fluid pressure responsive means simultaneously with the driving of said two-part sun gear as by an external motor.

5. A transmission system according to claim 3 wherein said means opposing said resilient means may be characterized as a mechanical actuator having fluid pressure override mechanism.

References Cited by the Examiner

UNITED STATES PATENTS

| | | | |
|---|---|---|---|
| 1,318,568 | 9/1919 | Kittredge | 74—750 X |
| 1,427,599 | 8/1922 | Johanson | 74—750 |
| 2,248,133 | 7/1941 | Snow | 74—750 X |
| 2,480,212 | 8/1949 | Baines | 192—8 |
| 2,660,029 | 11/1953 | Geyer | 60—6 |
| 2,927,669 | 3/1960 | Walerowski | 192—4 |
| 2,985,036 | 5/1961 | Forster | 74—740 |

DAVID J. WILLIAMOWSKY, *Primary Examiner.*

J. R. BENEFIEL, *Assistant Examiner.*